US012528917B2

United States Patent
Nyanhongo et al.

(10) Patent No.: US 12,528,917 B2
(45) Date of Patent: Jan. 20, 2026

(54) METHOD FOR PREPARING A LIGNOSULFONATE POLYMER

(71) Applicant: UNIVERSITÄT FÜR BODENKULTUR WIEN, Vienna (AT)

(72) Inventors: Gibson Stephen Nyanhongo, Tulln (AT); Georg Guebitz, Tulln (AT); Andreas Ortner, Tulln (AT); Sabrina Bischof, Tulln (AT)

(73) Assignee: Universität Für Bodenkultur Wien, Vienna (AT)

( * ) Notice: Subject to any disclaimer, the term of this patent is extended or adjusted under 35 U.S.C. 154(b) by 1213 days.

(21) Appl. No.: 17/425,218

(22) PCT Filed: Jan. 24, 2020

(86) PCT No.: PCT/EP2020/051720
§ 371 (c)(1),
(2) Date: Mar. 2, 2022

(87) PCT Pub. No.: WO2020/152314
PCT Pub. Date: Jul. 30, 2020

(65) Prior Publication Data
US 2022/0195128 A1    Jun. 23, 2022

(30) Foreign Application Priority Data

Jan. 24, 2019  (AT) ............... A 50053/2019

(51) Int. Cl.
| | | |
|---|---|---|
| C08J 9/12 | (2006.01) | |
| A01G 24/35 | (2018.01) | |
| C08H 8/00 | (2010.01) | |
| C12P 11/00 | (2006.01) | |

(52) U.S. Cl.
CPC ............ *C08H 8/00* (2013.01); *A01G 24/35* (2018.02); *C08J 9/122* (2013.01); *C12P 11/00* (2013.01); *C08J 2397/02* (2013.01)

(58) Field of Classification Search
CPC ........ A01G 24/35; B01D 61/145; C08H 8/00; C08J 9/122; C08J 2397/02; C12P 11/00
See application file for complete search history.

(56) References Cited

U.S. PATENT DOCUMENTS 4,332,589 A * 6/1982 Lin .................... C09B 67/0086
8/589

FOREIGN PATENT DOCUMENTS

| DE | 3037992 A1 | 8/1982 |
| DE | 4331878 A1 | 3/1995 |
| DE | 19700904 A1 | 7/1998 |
| DE | 19700907 A1 | 7/1998 |
| DE | 19828483 A1 | 1/1999 |
| WO | 9831875 A1 | 7/1998 |

OTHER PUBLICATIONS

EP Office Action dated Apr. 25, 2022 of Registration No. 207030162.6-1111.
"Investigation of the Molecular Weight Increase of Commercial Lignosulfonates by Laccase Catalysis", D. Areskogh et al., Biomacromolecules, vol. 11, No. 4, 23. Feb. 23, 2010, pp. 904-910.
EP Office Action dated Oct. 10, 2023 of Registration No. 207030162.6-1111.
"Influence of Oxygen and Mediators on Laccase Catalyzed Polymerization of Lignosulfonate", Daniela Huber et al, ACS Sustainable Chemistry & Engineering, vol. 4, No. 10, Jun. 21, 2016, pp. 5303-5310.
EP Letter dated Feb. 18, 2022 of Application No. EP20703162.6.
EP Letter dated Aug. 23, 2022 of Application No. EP20703162.6.
"Laccase mediated oxidation of industrial lignins: Is oxygen limiting?", Ortner, A. et al., Process Biochemistry, vol. 50, No. 8, 2015, pp. 1277-1283.
"Polymerization of Various Lignins via Immobilized Myceliophthora thermophila Laccase (MtL)", Huber, D. et al., Polymers, vol. 8, No. 8, Aug. 3, 2016, p. 280.
"Polymerisation of Kraft lignin from black liquors by laccase from Myceliophthora thermophila: Effect of operational conditions and black liquor origin", Gouveia, S. et al., Bioresource Technology, Elsevier, Amsterdam, NL, vol. 131, Jan. 3, 2013, pp. 288-294.
Search Report and Written Opinion dated May 6, 2020 of International Application No. PCT/EP2020/051720.

* cited by examiner

*Primary Examiner* — John M Cooney
(74) *Attorney, Agent, or Firm* — Gordon & Jacobson, P.C.

(57) ABSTRACT

A method is provided for preparing a water-insoluble lignosulfonate polymer from a first solution containing lignosulfonate precursors, which involves
a) separating the lignosulfonate precursors from the first solution and providing a second solution with at least 5 wt % of lignosulfonate precursors obtained from the first solution, wherein the separating comprises filtering out components with a predefined particle diameter and separating low-molecular weight components including salts and low-molecular organic compounds,
b) adding a radical-forming enzyme and gas to the second solution, wherein the gas comprises oxygen, and
c) polymerizing the lignosulfonate precursors of the resultant solution of b).
Other related aspects are described and claimed.

17 Claims, 3 Drawing Sheets

METHOD FOR PREPARING A LIGNOSULFONATE POLYMER

CROSS-REFERENCE TO RELATED APPLICATION(S)

This application is the National Stage of International Patent Application No. PCT/EP2020/051720 filed on Jan. 24, 2020, which claims priority from Austrian Patent Application No. A50053/2019 filed on Jan. 24, 2019, both of which are herein incorporated by reference herein in their entireties.

BACKGROUND

The invention relates to a method for preparing a lignosulfonate polymer, a lignosulfonate polymer prepared by a method according to the invention, and a growth substrate comprising a lignosulfonate polymer according to the invention.

Lignosulfonates are also known as sulfonated lignin and are salts of lignosulfonic acid. Lignosulfonic acid is a water-soluble polymer substantially consisting of the monomer units coumaryl alcohol, coniferyl alcohol and sinapyl alcohol, with individual hydroxyl groups (—OH) substituted by sulfonyl groups (—$SO_3^-$).

Lignosulfonates occur as a by-product in the production of cellulose by the sulfite process. Lignosulfonate solutions prepared in this way are, for example, a waste material in paper production and are referred to in the prior art as red liquor or brown liquor. In addition to lignosulfonates, the brown liquor usually contains coarse components, such as lignin fibres or particles, as well as low-molecular components, such as salts or organic compounds.

Since brown liquor is produced in large quantities as a waste product in industrial processes, it would be desirable to use it as a raw material for the manufacture of certain products. Brown liquor is used, for example, in the preparation of wetting agents, dispersing agents, binders and adhesives, although large quantities are also used simply to generate energy through combustion.

In the context of the present invention, lignosulfonate polymers are those lignosulfonate structures in which further cross-linking of the native lignosulfonate units has taken place. Preferably, lignosulfonate polymers are substantially water-insoluble compared to lignosulfonates.

With methods known in the prior art, it has not yet been possible to prepare lignosulfonate polymers that are substantially completely lignosulfonate-based. According to the prior art, it is necessary to crosslink the lignosulfonate units with crosslinkers and thereby form copolymers. In this way, lignosulfonate polymers with a sufficiently high average molecular weight can be formed to exhibit the desired chemical and physical properties. Such copolymerization requires the use of additional raw materials and is undesirable in terms of the economics of a preparation method for lignosulfonate polymers.

SUMMARY

The object of the present invention is to overcome the problems of the prior art and to provide a method by which it is possible to create water-insoluble lignosulfonate polymers which are substantially entirely lignosulfonate-based and which, in particular, do not require the use of crosslinking additives.

The object of the invention is solved by the features of the patent claims. Preferred features result from the dependent patent claims.

In the context of the present invention, the term "water-insoluble" means that a substance, in particular a lignosulfonate polymer, is substantially insoluble in water. In particular, "water-insoluble" or "substantially water-insoluble" may mean that less than 0.1 wt % of the total mass of a substance in question is soluble in water at a temperature of 20° C.

The invention relates to a method for preparing a water-insoluble lignosulfonate polymer from a solution containing lignosulfonate precursors, in particular from brown liquor, comprising the steps of:
  selecting the lignosulfonate precursors and providing a solution with at least 5 wt %, preferably at least 10 wt %, of lignosulfonate precursors,
  adding a radical-forming enzyme and gassing of the lignosulfonate precursor solution with oxygen to form polymerizable lignosulfonate radicals, and
  polymerizing the lignosulfonate precursors.

In the context of the present invention, the term "lignosulfonate precursor" refers to any lignosulfonate-based starting substances suitable for the preparation of the lignosulfonate polymers according to the invention. In particular, a lignosulfonate precursor according to the present invention may be a mixture of water-soluble lignosulfonate oligomers. In particular, the lignosulfonate oligomers may be constituted by the partial structures/monomer units coumaryl alcohol, coniferyl alcohol and sinapyl alcohol, wherein individual hydroxyl groups are substituted by sulfonyl groups. An important, chemically structural property of the lignosulfonate precursors of the present invention is the presence of reactive phenolic OH groups, which are reducible to an oxygen radical by the radical-forming enzymes/the radical-forming enzyme according to the invention.

In the context of the present invention, the term "radical-forming enzyme" may refer to any enzyme capable of catalysing the formation of radicals, in particular oxygen radicals, in organic compounds, in particular in phenolic hydroxyl groups. Preferred radical-forming enzymes are laccases and peroxidases. Preferably, the radical-forming enzymes are obtained from a microbial culture, in particular from a fungal culture. Optionally, it may be provided that one or more radical-forming enzymes are provided for forming the lignosulfonate radicals.

The gassing of the lignosulfonate precursor solution with oxygen provided in the second step of the method according to the invention substantially denotes any method known in the prior art for supplying a solution with a gas. Suitable methods are sufficiently known to one skilled in the art and include, for example, injecting oxygen through a sinter frit. Optionally, the availability of oxygen in the reaction mixture may be improved by vigorous stirring.

Optionally, it is provided that the lignosulfonate precursors are water-soluble lignosulfonate oligomers having a molecular weight above 500 Da, preferably above 5000 Da. It may thus be provided that the lignosulfonate precursors do not contain lignosulfonate-based molecules having a molecular weight of less than 500 Da, preferably of less than 5000 Da.

Optionally, it is provided that the solution is an aqueous solution.

Preferably, it is provided that the radical-forming enzyme is a laccase, a peroxidase or a mixture of several of these enzymes. Optionally, mixtures of different laccases or peroxidases may be used.

Optionally, it is provided that oxygen is added as a gas with an admixture of not more than 10 vol %, preferably not more than 5 vol %, of other gases. This means, for example, that the added oxygen may contain an admixture of about 2% nitrogen or other gases. Preferably, however, oxygen is used in the form of pure oxygen without any substantial admixture of other gases. Common impurities contained in gaseous oxygen may be present in small amounts.

Optionally, the first method step, i.e. the step of separating or selecting the lignosulfonate precursors, comprises one or both of the following steps:
 filtering out components with a particle diameter of less than 1 μm, in particular of less than 100 nm, and/or
 separating low-molecular components, in particular salts and low-molecular organic compounds, preferably components with a molecular weight of less than 500 Da, preferably of less than 5000 Da.

This makes it possible to obtain the molecular weight fraction preferred for the polymerization of the lignosulfonate precursors. On the one hand, a removal of coarse particles or fibres can be achieved by the optionally provided method steps; on the other hand, it can be made possible to remove any interfering components with a low molecular weight from the lignosulfonate precursor fraction during the polymerization.

Optionally, it may be provided that the pH of the solution in the second method step is between 5 and 8, preferably between 6.5 and 7.5. Preferably, the pH of the solution is adjusted to the optimal activity range of the particular radical-forming enzyme used. The pH can be adjusted by any method known in the prior art, in particular by adding a basic or an acidic substance. A basic substance may be, for example, caustic soda (NaOH). An acidic substance may be, for example, hydrochloric acid (HCl).

Optionally, it is provided that at least one additive is added during or after the polymerization, said additive preferably being selected from elastomers, plasticizers, stabilizers and polymers. Preferably, the addition of the additive does not cause copolymerization of lignosulfonate units with the additive, i.e. there is substantially no covalent bonding between molecules of the additive or additives and the lignosulfonate polymer.

Optionally, the addition of additives may improve the properties of the lignosulfonate polymer obtained. For example, the addition of plasticizers, such as sorbitol, xylitol or glycerol, may improve the tensile strength of the lignosulfonate polymer. The plasticizer may be any substance known to a person skilled in the art as a plasticizer. Plasticizers may be present in the polymer in a content of 5 wt % to 50 wt %.

Optionally, the method according to the invention additionally comprises the step of foaming the lignosulfonate precursor solution during polymerization to form a lignosulfonate polymer foam. To form a lignosulfonate polymer foam, for example, sodium carbonate or sodium hydrogen carbonate can be added to the reaction mixture in combination with an acid. During the formation of carbon dioxide by the reaction of the carbonate/hydrogen carbonate with the acid, polymerization of the lignosulfonate precursors occurs and a solid or gel-like lignosulfonate polymer foam is formed. Such lignosulfonate polymer foams can be used in a particularly advantageous manner to retain water.

Optionally, the invention relates to a lignosulfonate polymer foam which is prepared by a method according to the invention. Such a lignosulfonate polymer foam may optionally have a porosity between 20% and 90%. Here, the porosity denotes the ratio of void volume to total volume.

Optionally, it is provided that the method additionally comprises the step of casting the lignosulfonate precursor solution during polymerization to form a lignosulfonate polymer material. In particular, this may involve casting the reaction mixture while still in the liquid state into a layer of substantially constant thickness, followed by the complete polymerization. After drying the polymer, a lignosulfonate polymer material, in particular a bioplastic, is obtained. Preferably, prior to the complete polymerization, a plasticizer, such as sorbitol or glycerol, is added in order to increase the tensile strength of the polymer material obtained.

Optionally, the invention relates to a bioplastic made of lignosulfonate polymer material, which is prepared by a method according to the invention.

In order to prepare a bioplastic from lignosulfonate polymer material, it may be provided that the reaction solution prepared in a method according to the invention is poured out. This means that the still liquid reaction solution is poured into any desired mould. Such moulds may be, for example, foils, films, foams or solid bodies of different geometry.

The thickness of a film or foil may be between 10 μm and 500 μm, preferably between 50 μm and 500 μm. However, the bioplastic prepared by a method according to the invention may also have greater thicknesses to form a solid body.

Preferably, a material according to the invention additionally comprises a plasticizer, such as sorbitol or glycerol, to improve elasticity and tearability.

Optionally, it is provided that the activity of the radical-forming enzyme after its addition to the reaction mixture is between 10 nkat/mL and 500 nkat/mL, in particular between 50 nkat/mL and 200 nkat/mL. The unit "nkat/mL" is a unit of catalytic activity commonly used in the field of enzymatic catalysis. 1 kat is that amount of an enzyme that converts 1 mol of substrate in 1 second.

The invention further comprises a lignosulfonate polymer prepared by a method according to the invention. Preferably, the lignosulfonate polymer prepared by the method according to the invention is a solid at room temperature, i.e. in particular at 25° C. In the method according to the invention, the polymerization is thus preferably carried out until a solid is obtained. Optionally, the polymer thus obtained has an average molecular weight of 200 kDa to 800 kDa, in particular 300 kDa to 500 kDa.

The invention further relates to a growth substrate for plants comprising between 0.1 wt % and 5 wt %, preferably between 0.5 wt % and 2 wt %, of a lignosulfonate polymer according to the invention. The amount given refers to dry lignosulfonate polymer. Optionally, the growth substrate may comprise between 1 wt % and 40 wt % of a hydrogel, i.e. a lignosulfonate polymer completely swelled in water.

Due to the good water-retaining effect of the lignosulfonate polymers obtained by the method according to the invention, the lignosulfonate can be used in a preferred manner in a growth substrate for water retention. In addition to the lignosulfonate polymer, such a growth substrate may comprise soil, sand, clay or other components typically found in a growth substrate for plants.

The lignosulfonate polymer according to the invention may be present in the growth substrate, in particular in the form of a lignosulfonate hydrogel. In the context of the present invention, a hydrogel refers in particular to a polymer which has a high water content or is saturated with water. Such a hydrogel may have a water content of at least 50%, preferably at least 80% or higher.

The invention further relates to a water-retaining means for a growth substrate, wherein the water-retaining means comprises or consists of a lignosulfonate polymer according to the invention.

The lignosulfonate polymer, in particular the water-retaining means, may optionally be in the form of a hydrogel containing water or in dry form. In dry form, the polymer may be in the form of a granulate, a powder or in known other forms.

The water absorption capacity of the lignosulfonate polymer according to the invention may be up to 2000% with respect to the dry weight of the polymer.

The lignosulfonate polymer may be biodegradable. Thus, when used as a water-retaining means for a growth substrate, it additionally serves as a fertiliser itself. Despite the biodegradability, the ability to retain water in a natural environment, for example in soil, can be maintained for several years, for example two to five years. Thus, when used as a water-retaining means, the lignosulfonate polymer according to the invention contrasts with conventional water-retaining means which are neither biodegradable nor have an inherent fertilising effect.

Optionally, in all embodiments of the method according to the invention, the radical-forming enzyme may be replaced by another suitable radical-forming agent. Such a radical-forming agent may be, for example, a conventional chemical radical initiator.

The lignosulfonate polymer according to the invention may optionally retain not only water, but also substances dissolved in water. Such substances may be salts, fertilizers, pesticides, other agrochemicals and the like. The lignosulfonate polymer according to the invention may therefore be suitable for the continuous release of water and other substances. This may, for example, reduce leaching of agrochemicals from the soil.

Further features of the invention become apparent from the patent claims, the figures and the exemplary embodiments.

In the following, the invention will be explained in detail by means of exemplary embodiments. The exemplary embodiments are only intended to illustrate the invention and do not limit the scope of protection.

BRIEF DESCRIPTION OF THE DRAWING

The Figures serve to further clarify the effects of the present invention.

DETAILED DESCRIPTION

Example 1—Preparation of a Lignosulfonate Polymer

The first exemplary embodiment describes the preparation of a water-insoluble lignosulfonate polymer, in particular a hydrogel containing a lignosulfonate polymer, by a method according to the invention.

The starting substance for the method according to the invention according to the first exemplary embodiment is brown liquor, such as is usually produced as a waste product.

In the first step of the method according to the invention, the brown liquor is filtered to remove solids, such as fibres or particles. A filter with a mesh size of about 5 µm is used.

Subsequently, an ultrafiltration step is carried out to remove salts, low-molecular lignin and other impurities from the brown liquor that could have a negative influence on the polymerization or on the quality of the polymerisate. Ultrafiltration steps are carried out with membranes of different retention properties, namely 20 kDa, 5 nm and 10 nm. Thus, a sufficiently pure lignosulfonate precursor solution is obtained. In addition, a concentration of the lignosulfonate precursors in the aqueous solution is carried out. In the exemplary embodiment described herein, the concentration of the lignosulfonate precursors is about 11 wt % after all filtration steps. The average molecular weight of the lignosulfonate precursors in the prepared solution is about 26 kDa.

2 L of the solution prepared as above are adjusted to a pH of about 7.0 by adding 1 M NaOH solution. Laccase from *Myceliophthora thermophila* is added until a final enzyme activity of about 160 nkat/mL is obtained. The reaction temperature in this exemplary embodiment is about 40° C. Preferably, the reaction temperature may be between 20° C. and 70° C.

Figure 1:
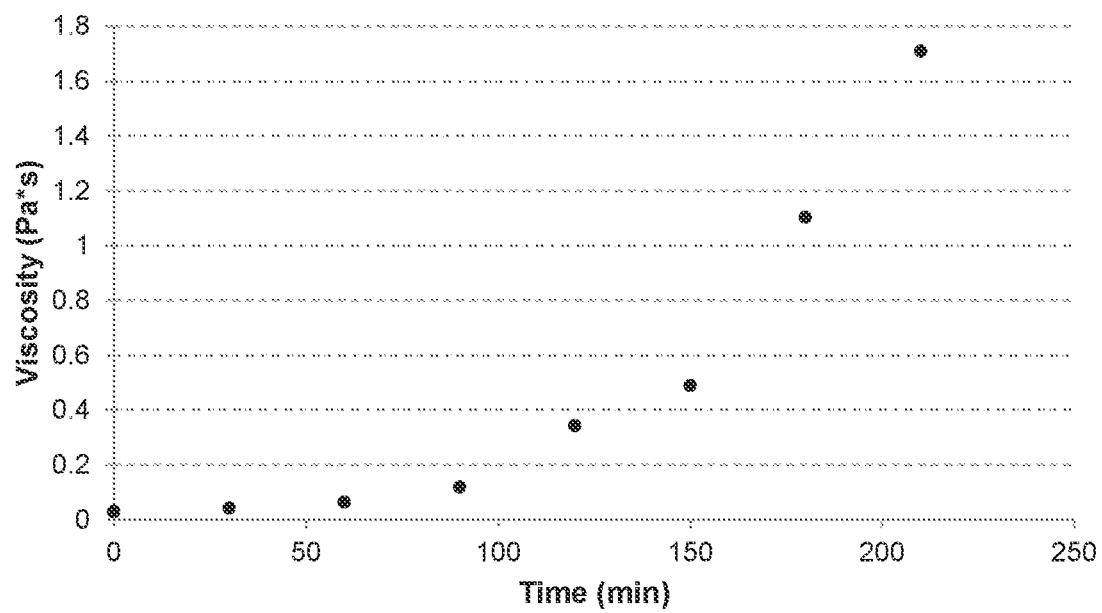
FIG. 1 shows the course of viscosity as a function of the reaction time in a first method according to the invention.

While stirring with a propeller stirrer (600 rpm), pure oxygen is injected into the solution through a sinter frit. The rate of oxygen addition is about 200 mL/min. Every 30 minutes a sample is taken from the reaction mixture, from which the viscosity and the average molecular weight are determined. The course of the viscosity as a function of the reaction time is shown in FIG. 1. The course of the average molecular weight as a function of the reaction time is shown in FIG. 2.

Figure 2:
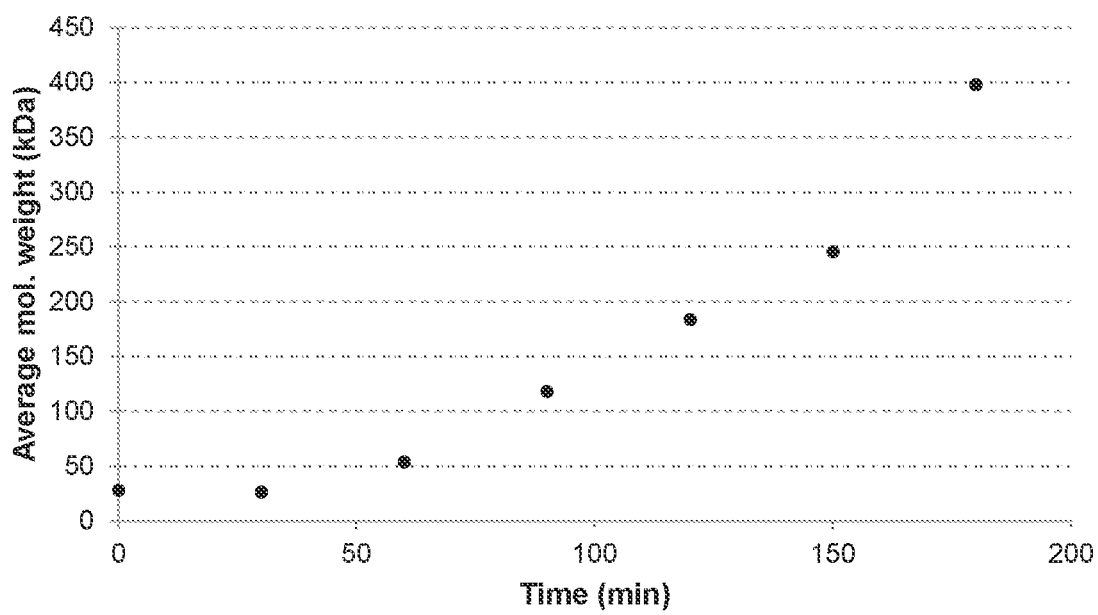
FIG. 2 shows the course of the average molecular weight as a function of the reaction time in the first method according to the invention.

FIG. 1 and FIG. 2 clearly show that both the viscosity of the solution and the molecular weight of the lignosulfonate polymers increase with the reaction time. This is an indicator for the successful polymerization of the lignosulfonate precursors.

After a reaction time of 250 min, the stirring and the addition of oxygen are stopped. If the mixture is allowed to rest, a gel-like solid is formed, which comprises lignosulfonate polymer and water. This gel-like solid is also called a hydrogel.

The hydrogel obtained is divided into pieces of about 20 g and dried at 80° C. for 12 hours in a drying oven. The weight reduction during drying is about 90 wt %, which suggests that about 90 wt % of the hydrogel is water. After complete drying, water is again added to the polymer, which causes the polymer to swell rapidly and to absorb water. No parts of the polymer can be observed to dissolve in water, so the lignosulfonate polymer obtained is insoluble in water.

Figure 3:
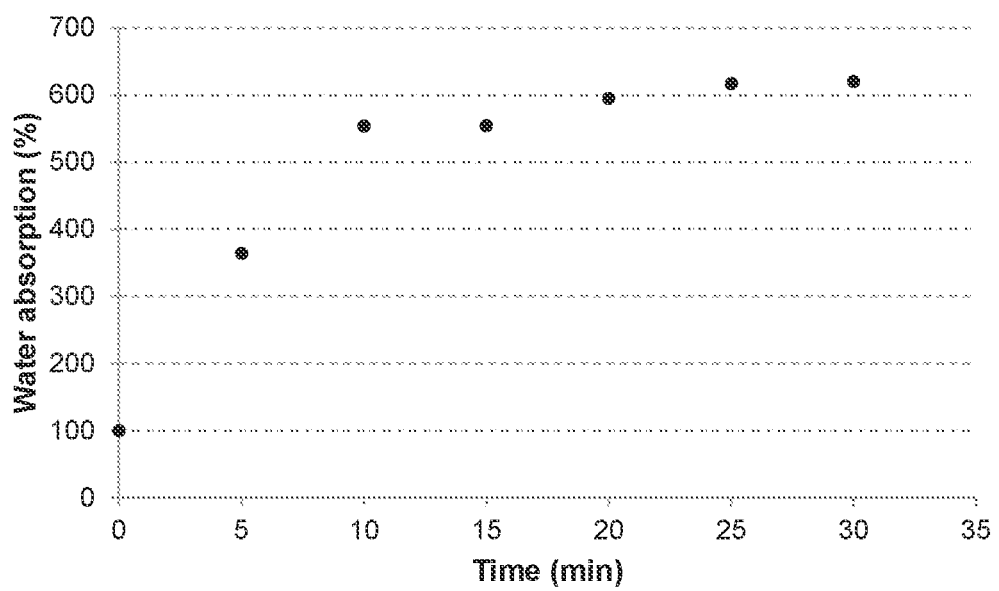
FIG. 3 shows the water absorption of a lignosulfonate polymer prepared and dried by the method according to the invention.
Figure 4:
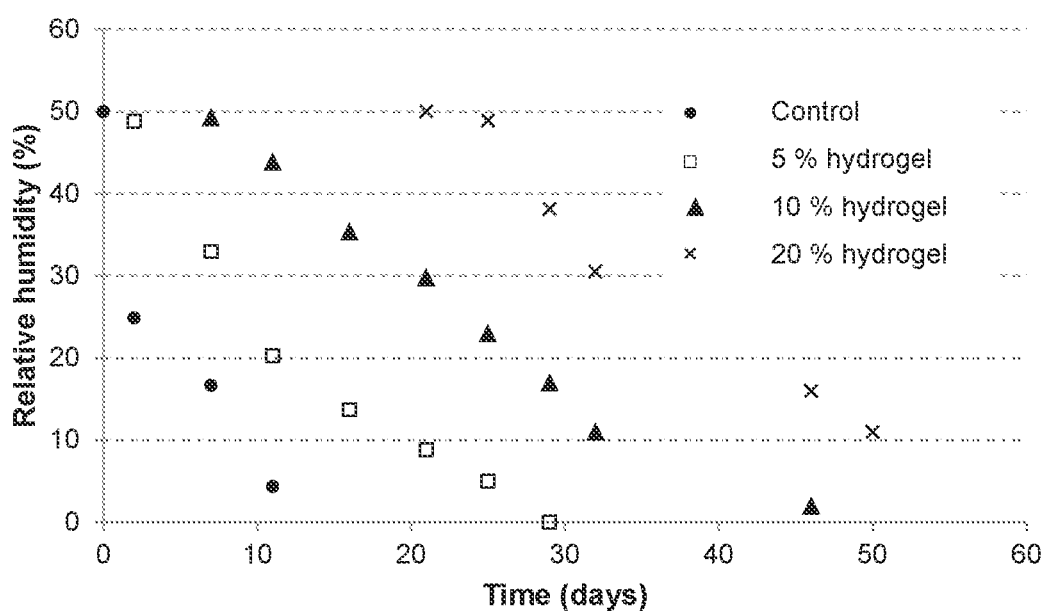
FIG. 4 shows the course of the relative humidity of growth substrates comprising a lignosulfonate polymer according to the invention.

The water absorption capacity of the dried polymer is tested by swelling the polymer pieces prepared as above. The course of the water absorption is shown in FIG. 3, where it can be seen that the water absorption amount substantially reaches a plateau after a swelling time of 20 min, which is about 600% of the original mass of the dry polymer.

Example 2—Lignosulfonate Polymer as Water Reservoir

In this example, the lignosulfonate polymer obtained in the first exemplary embodiment is used as a water reservoir in a growth substrate for plants. The reswollen polymer of Example 1 is mixed with a sand-soil mixture in a content of about 5, 10 and 20 wt %. In addition, a sand-soil mixture without addition of polymer is prepared as a control.

200 g of each of the growth substrates prepared in this way are placed in separate pots, with three pots of each substrate (sample and control) prepared. The substrates are soaked with water for 20 hours. After this time, excess water is poured off and three bean seeds are sown in each pot.

From this point on, no more watering is done, all pots are left at the same humidity, temperature and light level. After about 10 days, germination starts and a germination rate of about 94% (17 out of 18 seeds) is observed. In addition to observing the growth of the seedlings, the relative humidity of the growth substrate is measured at regular intervals. The course of the relative humidity of the substrate (average value of three pots with the same substrate) over time is shown in FIG. 3. While the relative humidity of the control substrate is already close to 0% after 11 days, it takes longer for the growth substrates containing hydrogel to dry out. For the growth substrate containing 20 wt % hydrogel, the relative humidity is still about 10% after 50 days.

The observation shown in FIG. 3 is consistent with the condition of the seedlings: While a clear wilting of the plants in the control substrates already starts after 15 days, the plants in the substrates containing hydrogel do not show any visible signs of water deficiency over the entire test period of 50 days.

Example 3—Preparation of Lignosulfonate Polymer Materials

For this exemplary embodiment, the lignosulfonate polymerization is carried out according to the method according to the invention described in the first exemplary embodiment. Prior to completion of the polymerization, varying weight contents of sorbitol or glycerol are added to the reaction mixture as plasticizer and the mixture is homogenised. Mixtures containing 25 wt %, 28 wt %, 33 wt %, 40 wt % and 50 wt % of sorbitol/glycerol are prepared.

After stopping the addition of oxygen and the stirring, the viscous reaction mixture is poured into plastic Petri dishes to a pouring height of about 1 mm, 2 mm and 4 mm. The cast layers of material are allowed to dry at 80° C. for about 30 min. The mechanical properties of the material according to the invention are tested on the basis of the layers thus obtained.

After drying, the layers or films have thicknesses of about 0.10 mm to 0.40 mm.

Tests are carried out on the materials to determine their mechanical strength.

Figure 5:
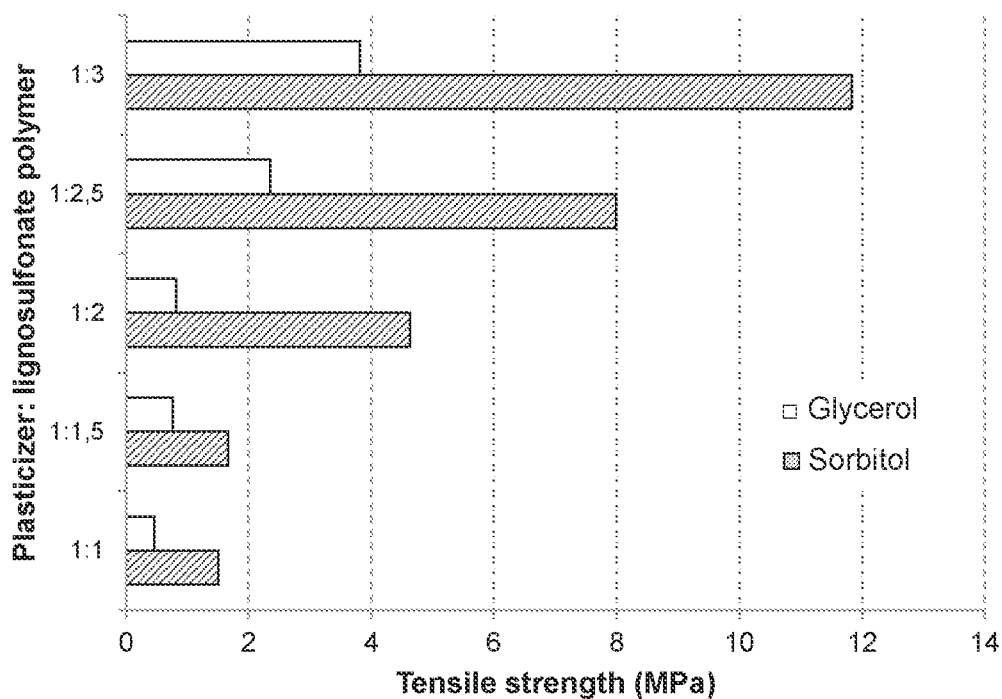
FIG. 5 shows the tensile strength of lignosulfonate polymer materials according to the invention.
Figure 6:
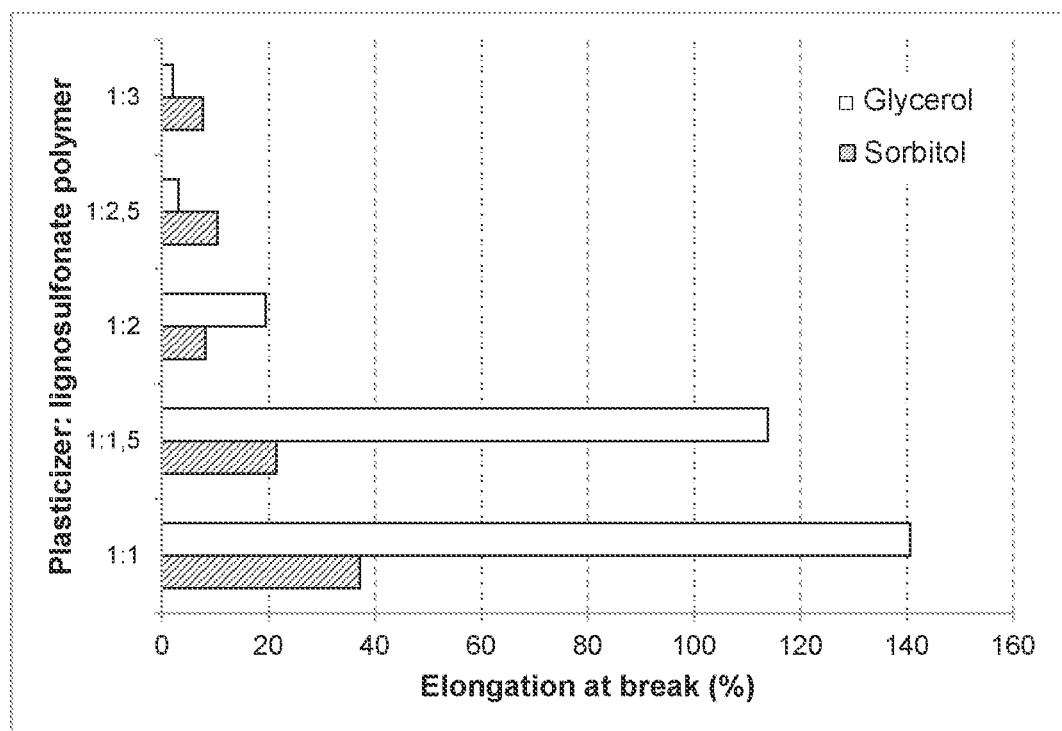
FIG. 6 shows the elongation at break of lignosulfonate polymer materials according to the invention.

FIG. 5 shows the tensile strength of the materials obtained, FIG. 6 shows the elongation at break.

It can be seen that a lower tensile strength is obtained with a higher content of plasticizer. With sorbitol, the tensile strength is higher than with the same content of glycerol.

Substantially the opposite of what has been said about the tensile strength is true for the elongation at break, which is shown in FIG. 6. Samples with a higher content of plasticizer show greater elongation. Samples with glycerol show greater elongation than samples with the same content of sorbitol.

The invention claimed is:

1. A method for preparing a water-insoluble lignosulfonate polymer from a first solution comprising brown liquor that contains lignosulfonate precursors, the method comprising:

a) separating lignosulfonate precursors from the first solution to provide a second solution with at least 5 wt % of lignosulfonate precursors, wherein the separating comprises filtering out components with a predefined particle diameter of less than 1 μm from the first solution and removing low-molecular weight components with a molecular weight of less than 500 Da from the first solution, b) adding an enzyme and gas to the second solution to form polymerizable lignosulfonate radicals, wherein the enzyme is adapted to catalyze the formation of oxygen radicals at phenolic hydroxyl groups, wherein the enzyme comprises a laccase, a peroxidase, or a mixture of these enzymes, and wherein the gas comprises oxygen added as gas with an admixture of not more than 10 vol % of other gases, and c) polymerizing lignosulfonate precursors of the resultant solution of b) to form a water-insoluble lignosulfonate polymer.

2. A method according to claim 1, wherein:
the brown liquor of the first solution is derived from a waste product in an industrial process.

3. A method according to claim 1, wherein:
the second solution comprises at least 10 wt % of lignosulfonate precursors.

4. A method according to claim 1, wherein:
the filtering of a) is configured to filter out components with a particle diameter of less than 100 nm.

5. A method according to claim 1, wherein:
the gas comprises oxygen added as gas with an admixture of not more than 5 vol % of other gases.

6. A method according to claim 1, wherein:
the lignosulfonate precursors of the first solution comprise lignosulfonate oligomers with a molecular weight of more than 500 Da.

7. A method according to claim 1, wherein:
the lignosulfonate precursors of the first solution comprise lignosulfonate oligomers with a molecular weight of more than 5000 Da.

8. A method according to claim 1, wherein:
the second solution is an aqueous solution, wherein oxygen is injected into the aqueous solution by a sinter frit.

9. A method according to claim 1, wherein:
the pH of the solution in b) is between 5 and 9.

10. A method according to claim 1, wherein:
the pH of the solution in b) is between 6 and 8.

11. A method according to claim 1, wherein:
at least one additive is added during or after the polymerization of c).

12. A method according to claim 11, wherein:
said at least one additive is selected from the group consisting of elastomers, plasticizers, stabilizers and polymers.

13. A method according to claim 1, further comprising:
foaming the resultant solution of b) during polymerization of c) to form a lignosulfonate polymer foam.

14. A method according to claim 1, further comprising:
pouring the resultant solution of b) during polymerization of c) to form a lignosulfonate polymer material.

15. A method according to claim 14, wherein:
the lignosulfonate polymer material comprises a lignosulfonate bioplastic.

16. A method according to claim 1, wherein:
the enzyme of b) has an activity between 10 nkat/mL and 500 nkat/mL.

17. A method according to claim 1, wherein:
the enzyme of b) has an activity between 50 nkat/mL and 200 nkat/mL.

\* \* \* \* \*